(12) United States Patent
Anderson et al.

(10) Patent No.: US 9,880,697 B2
(45) Date of Patent: Jan. 30, 2018

(54) REMOTE MULTI-TOUCH CONTROL

(71) Applicant: Intel Corporation, Santa Clara, CA (US)

(72) Inventors: Glen J. Anderson, Beaverton, OR (US); Lenitra M. Durham, Beaverton, OR (US); Pete A. Denman, Portland, OR (US); Andrea Johnson, Beaverton, OR (US); Sangita Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/368,517

(22) PCT Filed: Dec. 26, 2013

(86) PCT No.: PCT/US2013/077791
§ 371 (c)(1),
(2) Date: Jun. 25, 2014

(87) PCT Pub. No.: WO2015/099731
PCT Pub. Date: Jul. 2, 2015

(65) Prior Publication Data
US 2016/0299659 A1 Oct. 13, 2016

(51) Int. Cl.
*G06F 3/0481* (2013.01)
*G06F 3/01* (2006.01)
(Continued)

(52) U.S. Cl.
CPC .......... *G06F 3/04812* (2013.01); *G06F 3/016* (2013.01); *G06F 3/038* (2013.01);
(Continued)

(58) Field of Classification Search
None
See application file for complete search history.

(56) References Cited

U.S. PATENT DOCUMENTS 8,928,607 B1* 1/2015 Spackman .............. G06F 3/033
345/156
2007/0229465 A1* 10/2007 Sakai ..................... G08C 17/00
345/173
(Continued)

FOREIGN PATENT DOCUMENTS

CN 105940358 A 9/2016
EP 2677759 A1 12/2013
(Continued)

OTHER PUBLICATIONS

"International Application Serial No. PCT/US2013/077791, International Preliminary Report on Patentability dated Jul. 7, 2016", 6 pgs.

(Continued)

*Primary Examiner* — Jeffrey A Gaffin
*Assistant Examiner* — John M Heffington
(74) *Attorney, Agent, or Firm* — Schwegman Lundberg & Woessner, P.A.

(57) ABSTRACT

Various systems and methods for remote multi-touch control are described herein. A system may include a mode controller to enter an orientation mode for a user interface displayed by a presentation device, the orientation mode configured to allow a user of the presentation device to orient an input point on the user interface with a remote device, and an input/output module to receive an input from the user to trigger the presentation device to transition from the orientation mode to a pass-through mode, the pass-through mode configured to allow the user to control an application at the presentation device using a touch point on the remote device, the mode controller is to enter the pass-through mode at the presentation device, the input/output module is to receive input from the user via the remote device, and the
(Continued)

presentation device is to pass the input through to the application.

20 Claims, 5 Drawing Sheets

(51) Int. Cl.
    *G06F 3/038*    (2013.01)
    *G06F 3/041*    (2006.01)
    *G06F 3/044*    (2006.01)
    *G06F 3/0484*   (2013.01)
    *G06F 3/0488*   (2013.01)
    *G06F 3/16*     (2006.01)

(52) U.S. Cl.
    CPC ............ *G06F 3/044* (2013.01); *G06F 3/0416* (2013.01); *G06F 3/04847* (2013.01); *G06F 3/04883* (2013.01); *G06F 3/167* (2013.01); *G06F 2203/0383* (2013.01); *G06F 2203/04104* (2013.01); *G06F 2203/04808* (2013.01)

(56) References Cited

U.S. PATENT DOCUMENTS

| | | |
|---|---|---|
| 2011/0231796 A1 | 9/2011 | Vigil |
| 2011/0244928 A1* | 10/2011 | Cherpes .............. H04M 3/5183 |
| | | 455/569.1 |
| 2012/0212420 A1 | 8/2012 | Shin |
| 2012/0221960 A1* | 8/2012 | Robinson ............. G06Q 10/101 |
| | | 715/751 |
| 2012/0226742 A1 | 9/2012 | Momchilov et al. |
| 2012/0293449 A1 | 11/2012 | Dietz |
| 2013/0176102 A1 | 7/2013 | Bianrosa et al. |
| 2013/0285924 A1* | 10/2013 | Griffin ................ G06F 3/04812 |
| | | 345/173 |
| 2015/0261310 A1* | 9/2015 | Walmsley ............ G06F 1/1626 |
| | | 345/173 |

FOREIGN PATENT DOCUMENTS

| | | |
|---|---|---|
| EP | 3087456 A1 | 11/2016 |
| KR | 1020160077130 A | 7/2016 |
| WO | WO-2015099731 A1 | 7/2015 |

OTHER PUBLICATIONS

"International Application Serial No. PCT/US2013/077791, International Search Report dated Oct. 13, 2014", 3 pgs.
"International Application Serial No. PCT/US2013/077791, Written Opinion dated Oct. 13, 2014", 4 pgs.
"Korean Application Serial No. 10-2016-7013730, Office Action dated Oct. 13, 2016", W/ Machine Translation, 5 pgs.
"Korean Application Serial No. 10-2016-7013730, Response filed Dec. 13, 2016 to Office Action dated Oct. 13, 2016", W/ English Claims, 16 pgs.
"European Application Serial No. 13900358.6, Extended European Search Report dated May 26, 2017", w/ English Translation, 9 pgs.
"Korean Application Serial No. 10-2016-7013730, Response filed Jun. 12, 2017 to Office Action dated Apr. 13, 2017", w/ English Claims, 14 pgs.

* cited by examiner

REMOTE MULTI-TOUCH CONTROL

This application is a U.S. National Stage Application under 35 U.S.C 371 from International Application No. PCT/US2013/077791, filed on Dec. 26, 2013, which is hereby incorporated by reference in its entirety.

TECHNICAL FIELD

Embodiments described herein generally relate to input devices and in particular, to remote multi-touch control.

BACKGROUND

In computing, an input device includes any hardware equipment used to provide data or control signals to a computing device, such as a computer. Examples of input devices include keyboards, mice, scanners, digital cameras, joysticks, motion detectors, and touchpads.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In many user interfaces, conventional cursor-based input mechanisms or keyboard-based input mechanisms have been replaced or augmented with multi-touch input mechanisms. Various gestures have been implemented to allow users to interact with the graphical user interface, which may be presented on a touchscreen interface. Some gestures include selecting items with a tap or moving items with a tap and drag. Other gestures are multi-touch gestures and include multiple fingers (or contact points), such as a two finger rotate, a two finger zoom, a four finger swipe, or a five finger pinch. These multi-touch gestures perform intuitive actions, such as rotating a picture with a two finger rotate gesture or magnifying a document view with a two finger zoom gesture. Many other gestures may be available to a user operating in a multi-touch environment.

In some cases, a user may want to a use a touch-based device from a distance or with another device to act as the input. Touch-sensitive surfaces may be embedded in fabrics that may be used in clothing. Touch-sensitive input mechanisms may also be integrated in an auxiliary device used to control input for a touch-based device. For example, a user may be seated in the back seat of a car with a touch-based computer mounted on the headrest of the passenger seat in the front row. While the user may be able to reach forward and control the touch-based computer directly, it may be more convenient to control the touch-based computer from the user's resting position, such as by touching a portion of their pants, which includes a touch-sensitive fabric. Alternatively, the user may use an auxiliary device with a touch input, such as a smartphone, to control the touch-based computer. In either case, the user may control the touch-based computer with single-finger, multi-finger, gesture, or other input as if the user were controlling the touch-based computer directly.

This document describes a two-stage approach to controlling a remote computer. In the first stage, the user may use touch input on a local device (local to the user) to orient the location of one or more finger positions on the remote device (remote from the user). While "remote" is used here, the distance may be relatively close (e.g., within a few feet or inches). In fact, the user may be holding the remote device in one hand while controlling it with another device, such as touch-sensitive clothing. In orientation mode, the user's touches on the local device are not used as input to the remote device. That is, the user's touches are not used to control applications or the operating system of the remote device. Instead, during orientation mode, the user is presented an indication on the remote device illustrating where their finger location(s) are so that the user may anticipate where an input will be activated. In the second stage, touch input received at the local device is passed through to the application or operating system at the remote device.

Figure 1:
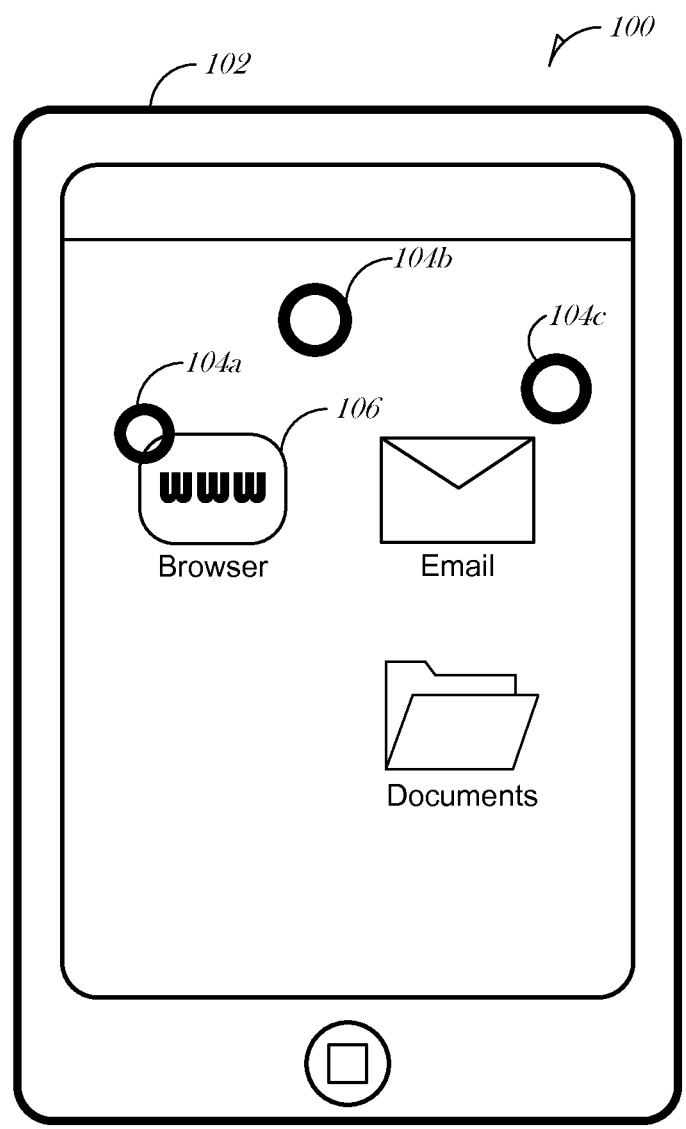
FIG. 1 is a user interface illustrating an orientation mode on a touch-based device, according to an embodiment.

FIG. 1 is a user interface 100 illustrating an orientation mode on a touch-based device 102, according to an embodiment. The touch-based device 102 may be a device such as a smartphone, cellular telephone, mobile phone, laptop computer, tablet computer, music player, or other portable networked device. In general, the touch-based device 102 is a computing device that implements a touch-input mechanism. The touch-input mechanism may be integrated into the display, such as with a tablet device, or separate from the display, such as with a notebook with a touchpad. In either case, the touch-based device 102 is able to receive and process single-touch and multi-touch input commands.

Also illustrated in FIG. 1 are touch points 104a, 104b, 104c (collectively referred to as 104). The touch points are representations of the user's touch input positions on an input device, which is separate and remote from the touch-based device 102. For example, the user may be touching a wearable touch-sensitive surface with three fingers. In orientation mode, the positions of the user's fingers are placed on the user interface 100, such as in an overlay. During the orientation mode, the user's touches are not passed through to the operating system or applications on the touch-based device 102.

Note that in the example illustrated in FIG. 1, the user's index finger touch position 104a is slightly off to the left of a browser icon 106. The user may reposition (e.g., slide) their index finger in order to position the touch position 104a more on-center to the browser icon 106. The user may then lift their index finger and press it back down on the desired button (e.g. the browser icon 106) to activate the related function (e.g., execute the browser application). By lifting their finger temporarily, the user may enter the second stage, the pass-through stage, where additional touches are processed on the touch-based device 102.

Figure 2:
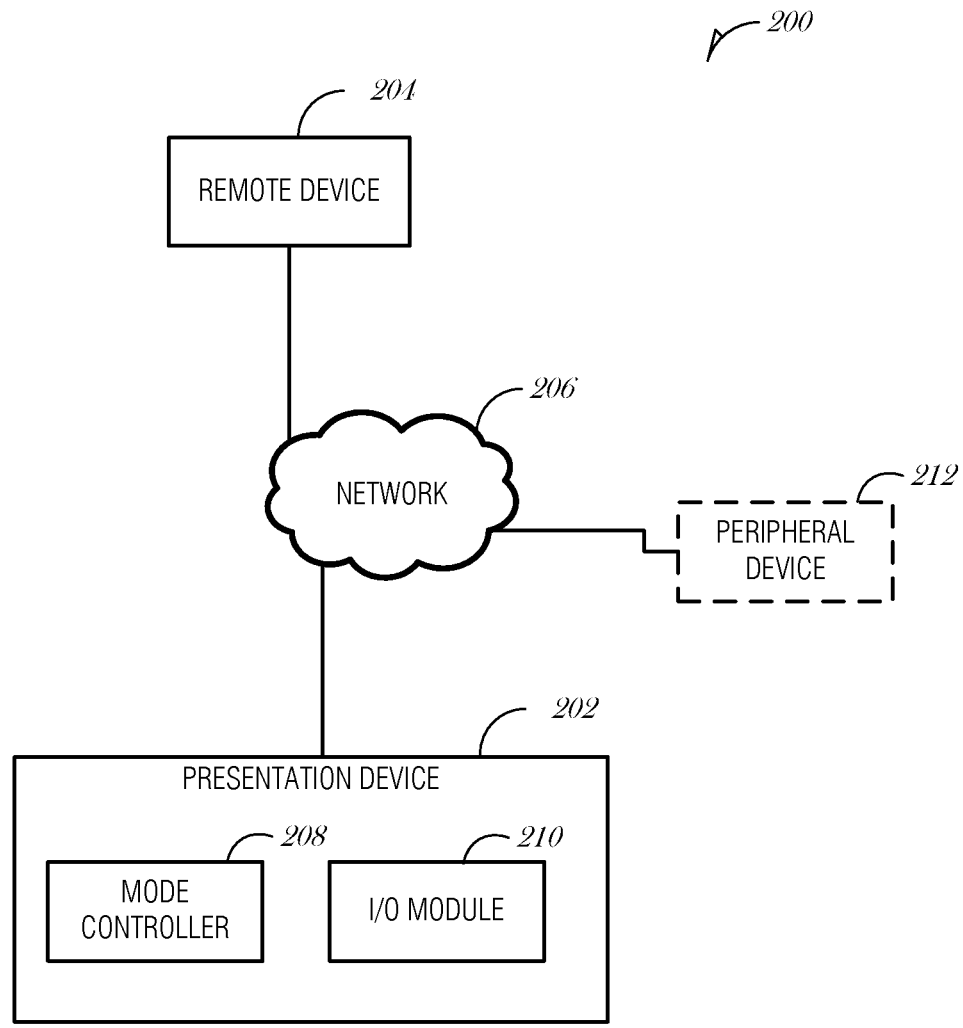
FIG. 2 is a schematic drawing illustrating a system to provide remote multi-touch control, according to an embodiment.

FIG. 2 is a schematic drawing illustrating a system 200 to provide remote multi-touch control, according to an embodiment. FIG. 2 includes a presentation device 202 (e.g., like the touch-based device 102 described above) and a remote device 204 communicatively coupled via a network 206.

The presentation device 202 may be a device such as a smartphone, cellular telephone, mobile phone, laptop computer, tablet computer, music player, television, head-mounted computing device, or other networked device. The presentation device 202 may also be a projected interface that is projected on a wall or other surface from a projector. In general, the presentation device 202 is a computing device that implements a touch-input mechanism. The touch-input mechanism may be integrated into the display, such as with a tablet device, or separate from the display, such as with a notebook with a touchpad. In either case, the presentation device 202 is able to receive and process single-touch and multi-touch input commands.

The remote device 204 may be separate from the presentation device 202. The remote device 204 may be a device similar to the presentation device 202, in that the remote device 204 includes touch-based input and may be embodied in various types of devices, such as a smartphone, cellular telephone, mobile phone, laptop computer, tablet computer, table-top touchscreen device, or other networked device. In addition, the remote device 204 may be a worn computing device, such as smartglasses, a smartwatch, a touch-sensitive fabric, or the like.

The touch surface on the remote device 204 may be mapped to the touch input area of the presentation device 202. In some cases, the screen orientation (portrait versus landscape) may differ between the two devices. In this case, only a portion of the remote device 204 touch surface may be used to control the presentation device 202. In other cases, the resolutions between the remote device 204 touch surface and the presentation device 202 touch input area may be significantly different. In such a case, a small motion by the user on a smaller resolution touch surface at the remote device 204 may cause a rather large movement of touch indications at the presentation device 202. Similarly, a double tap or other type of motion on the remote device 204 may not be recognized as a double tap at the presentation device 202 because a slight misalignment of taps at the remote device 204 is magnified to a significant error at the presentation device. To account for this, various filters may be implanted to smooth movements, account for tapping motions and potential scaling error, and other gesture and touch processing.

The network 206 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 206 may include a single local area network (LAN) or wide-area network (WAN), or combinations of LANs or WANs, such as the Internet. The various devices (e.g., presentation device 202 or remote device 204) coupled to the network 206 may be coupled to the network 206 via one or more wired or wireless connections.

The presentation device 202 may include a mode controller 208 and an input/output module 210. Various modules 208, 210 may be incorporated or integrated into an application that executes on the presentation device 202. Also, in some embodiments, the I/O module 210 or parts of the I/O module 210 may be co-located with the remote device 204. In such embodiments, the presentation device 202 acts as a monitor.

In operation, a user may operate the remote device 204 to place one or more fingers on a touch-input surface of the remote device. The remote device 204 may communicate with the presentation device 202 to transmit the locations, movement, pressure, or other attributes of the touches on the remote device 204. Upon receipt of the touches from the remote device 204, the presentation device 202 may enter an orientation mode or a pass-through mode to allow the user of the remote device 204 to either orient their touches or control the presentation device 202, respectively.

The touch-input surface of the remote device 204 may be a touchscreen. The touch-input surface may be painted a solid color to indicate that the remote device 204 is in a remote control operation mode, instead of for conventional operational use. For example, the user may use a smartphone to control the presentation device 202 and execute an application on the remote device 204, which displays a framed or blank area for the user to input touch input. The area may be scaled to roughly approximate the proportions or shape of the presentation device 202 to provide the user some relative orientation. The remote device 204 screen may also turn off at some point during an interactive session to save battery life while the touch surface remains active.

In FIG. 2, the presentation device 202 operates as a system to provide remote multi-touch control. The mode controller 208 may be used to enter an orientation mode for a user interface displayed by a presentation device 202, the orientation mode configured to allow a user of the presentation device 202 to orient an input point on the user interface with the remote device 204. The input/output module 210 may be used to receive an input from the user to trigger the presentation device 202 to transition from the orientation mode to a pass-through mode, the pass-through mode configured to allow the user to control an application at the presentation device 202 using a touch point on the remote device 204. The mode controller 208 may then enter the pass-through mode at the presentation device 202 and the input/output module 210 may receive input from the user via the remote device 204. The presentation device 202 may then pass the input through to the application at the presentation device 202.

In an embodiment, to enter the orientation mode, the mode controller 208 is to receive an indication that the user is contacting a plurality of touch points at the remote device 204. For example, the user may have to provide three touches and hold the touches to the remote device 204 for at least a threshold period, such as two seconds, for the presentation device 202 to enter the orientation mode.

In an embodiment, the orientation mode is a default mode for the presentation device 202 with respect to the remote device 204. In this embodiment, any user touches at the remote device 204 may be presented on the presentation device 202 in orientation mode.

The user may have to provide a gesture at the remote device 204 to enter the orientation mode. Thus, in an embodiment, to enter the orientation mode, the mode controller is to receive an indication that a gesture was performed at the remote device 204.

In an embodiment, wherein when in orientation mode, the presentation device 202 is to present a visual indication in the user interface corresponding to the touch point on the remote device 204. The visual indication may be a circle, dot, or other graphical representation to help the user orient their touch positions in the user interface of the presentation device 202. In an embodiment, to present the visual indication, the presentation device 202 is to present a circle representing a location in the user interface corresponding with the touch point on the remote device 204.

In an embodiment, when in orientation mode, the presentation device 202 is to present a contextual menu on the presentation device 202. Using a gesture, a certain number of fingers, or other touch input, the user may call up a contextual menu on the presentation device 202. The contextual menu may provide links to activate programs (e.g., favorite programs, frequently used programs, or recommended programs), perform a certain function (e.g., restart the presentation device 202, shutdown the presentation device 202, etc.), control an executing application (e.g., pause playback), or perform another function.

In an embodiment, when in pass-through mode, the presentation device 202 is to present a visual indication in the user interface corresponding to the touch point on the remote device 204. The visual indication in pass-through mode may be distinguishable from the visual indication in orientation mode by way of a different color, shape, picture, icon, or other attributes of the visual indication. In an embodiment, to present the visual indication, the presentation device 202 is to present a circle representing a location in the user interface corresponding with the touch point on the remote device 204.

In an embodiment, the presentation device 202 is to present a visual indication in the user interface corresponding to the touch point on the remote device 204 and change an attribute of the visual indication based on whether the presentation device 202 is in the orientation mode or the pass-through mode. In a further embodiment, to change the attribute of the visual indication, the presentation device 202 is to change the color of the visual indication. In another embodiment, to change the attribute of the visual indication, the presentation device 202 is to change the shape of the visual indication.

In an embodiment, to receive the input from the user to trigger the presentation device 202 to transition from the orientation mode to the pass-through mode, the input/output module 210 is to receive a voice command to transition modes. For example, the user may speak "computer—change mode to orientation" or "computer—change mode to presentation." Speech may be used in conjunction with touch input.

As another example, the user may use another device other than the remote device 202 (e.g., a peripheral device 212) to control mode changes or other aspects of the system 200. For example, the peripheral device 212 may be an electronic ring that the user wears. The user may use the electronic ring and press a button on the ring to change modes. Thus, in an embodiment, to receive the input from the user to trigger the presentation device to transition from the orientation mode to the pass-through mode, the input/output module 210 is to receive a message from a peripheral device 212, separate from the remote device, to transition modes. In a further embodiment, the peripheral device 212 comprises a ring. The peripheral device 212 may also be used for other purposes, such as to change which presentation device 202 the remote device 204 is controlling. In this manner, the remote device 204 may be used as input for two or more presentation devices 202.

In an embodiment, to receive the input from the user to trigger the presentation device 202 to transition from the orientation mode to the pass-through mode, the input/output module 210 is to receive a signal from a control on the remote device 204 to transition modes. In a further embodiment, the control comprises a hard button, a slider, or a soft button. For example, the remote device 204 may have a button on the side of a housing, which when pressed by the user, toggles modes on the presentation device 202.

A particular finger may act as the modal control as well. So, assuming all five fingers down help to get orientation, then the thumb, for example, may not pass through inputs to the application on the presentation device 202, but act as a control to switch applications/devices, go back to previous screen, take the user to the home screen, etc. Thus, in an embodiment, to receive the input from the user to trigger the presentation device 202 to transition from the orientation mode to the pass-through mode, the input/output module 210 is to receive an indication the user touched a particular finger to the remote device 204. In an embodiment, the particular finger is mapped to a function in the user interface of the presentation device 202, and after receiving the indication that the user touched the particular finger to the remote device, the presentation device 202 is to execute the function in the user interface. Within this approach the user could map particular functions to particular fingers, e.g., the index finger is for pass-through to the current application, the thumb takes the user to a home screen or special control menu, and the pinky takes the user back in a web browser or undoes a previous command, etc. Finger identification may be implemented using a fingerprint sensor to uniquely identify user's fingers.

In an embodiment, to enter the pass-through mode, the input/output module 210 is to provide a signal to the remote device 204 to provide haptic feedback to the user indicating the transition to the pass-through mode. The haptic feedback may be toggled on or off by the user.

In an embodiment, to enter the pass-through mode, the input/output module 210 is to provide a signal to the remote device 204 to provide audio feedback to the user indicating the transition to the pass-through mode. For example, a chime, a voice, or some other audible signal may be used to provide feedback to the user regarding mode changes. Alternatively, the audio feedback may be presented by the presentation device 202.

In an embodiment, to receive input from the user via the remote device 204, the input/output module 210 is to receive one of a tap, a pattern of taps, a swipe, a squeeze, or a drag from the user. Any type of single-touch or multi-touch input is contemplated by this disclosure.

In an embodiment, to receive input from the user via the remote device 204, the input/output module 210 is to receive a gesture from the user, the gesture corresponding to an application or a function to be executed at the presentation device. Gestures may be configured to execute a certain function, such as "shutdown," "reboot," "navigate forward," "undo last operation," or the like. Gestures may be mapped to execute an application, such as to open up an email client application.

Figure 3:
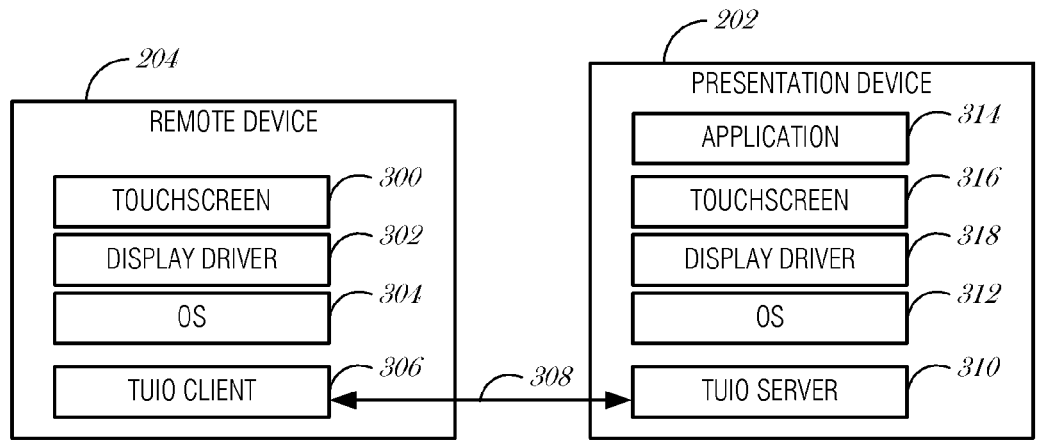
FIG. 3 is a schematic of a computer architecture of a remote device and a presentation device, according to an example embodiment.

FIG. 3 is a schematic of a computer architecture of a remote device 204 and a presentation device 202, according to an example embodiment. The remote device 204 includes a touchscreen 300 (e.g., capacitive or resistive), a display driver 302, an operating system 304, and a TUIO client 306. The touchscreen 300 is used by the user to input single or multiple finger input. The operating system 304 receives input and provides output via the touchscreen 300. The display driver 302 operates with the operating system 304 to produce the display on the touchscreen 300. The remote device 204 is connected to the presentation device over a connection 308. The connection 308 may be any kind of connection including physical or wireless connections. In various embodiments, the connection 308 includes a wireless network including, but not limited to, wireless display (WiDi) technology, Bluetooth®, IEEE 802.11, Wi-Fi™, or other personal area networks or wireless local area networks. In other embodiments, the connection 308 includes a universal serial bus (USB), high-definition multimedia interface (HDMI), video graphics array (VGA), or digital visual interface (DVI) connection. While the embodiment of the remote device 204 illustrated in FIG. 3 includes a touchscreen, it is understood that the remote device 204 may not have a screen, such as may be the case with a touch-sensitive clothing or a plain surface (e.g., a tabletop) that is used for input with cameras to detect the user's finger position.

The TUIO client 306 is used to collect the touch input stream from the touchscreen 300 and transmit it to a TUIO server 310 executing on the presentation device 202. TUIO is an open framework that defines a common protocol and API for tangible multitouch surfaces. TUIO is based on Open Sound Control, which is a standard musical instrument control I/O mechanism. The default transport method for the TUIO protocol is the encapsulation of the binary OSC bundle data within UDP packets sent to the default TUIO port number 3333. However, OSC is not directly bound to a dedicated transport method, and as such, alternative transport channels such as TCP can be employed to transmit the OSC-encoded TUIO data. While the embodiment illustrated in FIG. 3 uses TUIO and OSC over UDP, it is understood that other transport mechanisms and communication protocols may be used.

At the presentation device 202, the TUIO server 310 receives the TUIO message from the TUIO client 306 on the remote device 204 and processes it. The message may execute a function or application, or cause some other event on the operating system 312 or the application 314 on the presentation device 202. In addition, the presentation device 202 includes a touchscreen 316 and a display deriver 318, like the remote device. However, the touchscreen 316 is not used to directly control the presentation device 202.

The TUIO client 306 may transfer event messages to the TUIO server 310. For example, a standardized event message for various touch input movements or actions may be transmitted from the remote device 204 to the TUIO server 310 of the presentation device 202. Touch input may be any input, including but not limited to, a single tap, a double tap, a triple tap, a tap and drag, a swipe with one or more finger, a pinch, a squeeze, or the like.

The application 314 may receive event messages and react to them as if the input were coming from the touchscreen 316 on the presentation device 202. The application 314 may be any of a variety of applications, such as a multimedia presentation application (e.g., movie player or slideshow player), an entertainment application (e.g., a game), or a utility application (e.g., a word processor, email, or office work application).

Thus, in the embodiment illustrated in FIG. 3, a user is able to control the operating system 312 or an application 314 presented on the presentation device 202 with typical touch input and gestures made on the remote device 204.

The presentation device 202 may include a special build of an operation system (e.g., Android™) that allows the remote input to have special permissions to control input. Alternatively, the presentation device 202 may be a computing device running a virtual machine that runs one operating system (e.g., Microsoft Windows®) to execute a version of a second operating system (e.g., Android™).

Figure 4:
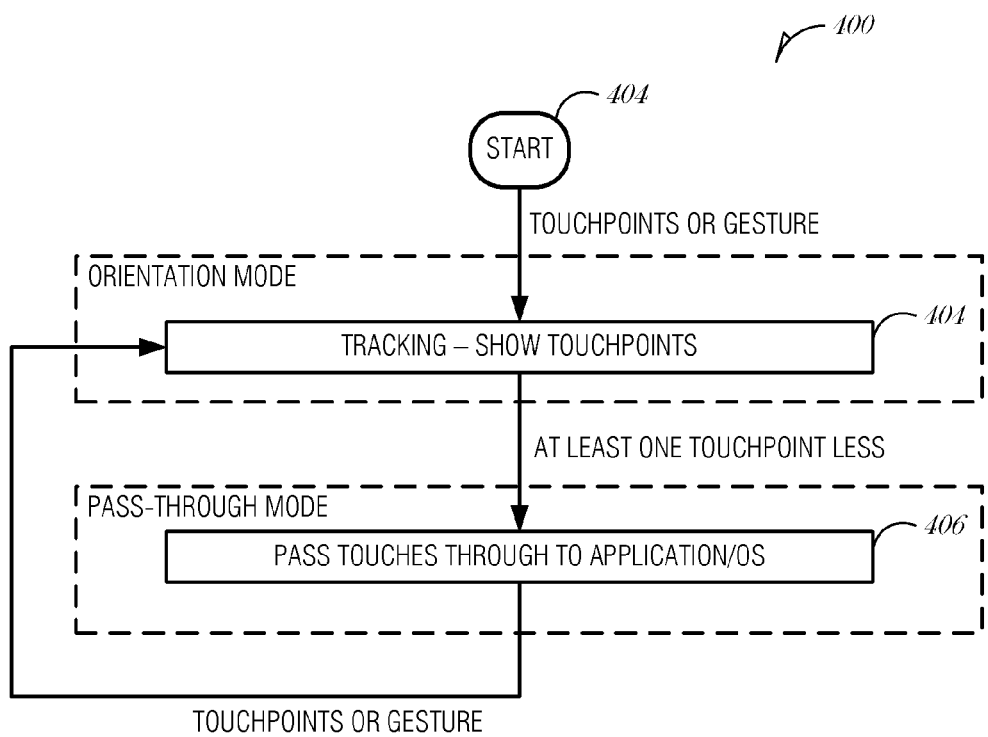
FIG. 4 is a flowchart illustrating a control flow to change operating modes of a presentation device, according to an embodiment.

FIG. 4 is a flowchart illustrating a control flow 400 to change operating modes of a presentation device 202, according to an embodiment. The control flow 400 begins at 402, where the presentation device 202 may be in an orientation mode by default. The default orientation mode may be for a short period of time, such as two seconds. After the time expires, the presentation device 202 may transition to an operating mode where messages from the remote device 204 are ignored.

The user may initiate the orientation mode using a touch or gesture. For example, if the user touches the remote device 204 with at least three fingers and holds them in a roughly stationary position for more than two seconds, then the presentation device 202 may enter the orientation mode. If the user places a correct number of fingers on the remote device 204 or uses a gesture, then the orientation mode is initiated and the presentation device 202 creates two or more corresponding touchpoints on the presentation device 202. The control flow 400 transitions to 404, where the presentation device 202 shows the touchpoint indications and tracks them if they move around.

If the user lifts at least one finger from the remote device, thus reducing the number of touchpoints by at least one, then the control flow 400 transitions to 406, where further touches are passed through to the application or operating system. This is the pass-through mode.

When the user places the requisite number of fingers or uses the requisite gesture on the remote device 204, then the control flow 400 transitions back to the orientation mode.

For example, the user may place and hold three fingers on the remote device 204 to initiate orientation mode on the presentation device 202. The user may then position their fingers to zoom in on a picture displayed on the presentation device 202, using the touchpoint indications to orient and position their fingers. After positioning their index and middle finger in an appropriate place, the user may lift their ring finger, thus causing the presentation device 202 to transition to the pass-through mode. The user may then pinch or expand their index and middle fingers to zoom in or out on the displayed picture. After zooming, the user may want to close the picture, and so they put their third finger back on the remote device 204 to re-enter the orientation mode and positions their index finger over the close control. The user may then lift their middle or ring finger to re-enter the pass-through mode, tap once with their index finger (which is over the close control), and then continue.

Figures 5, 6:
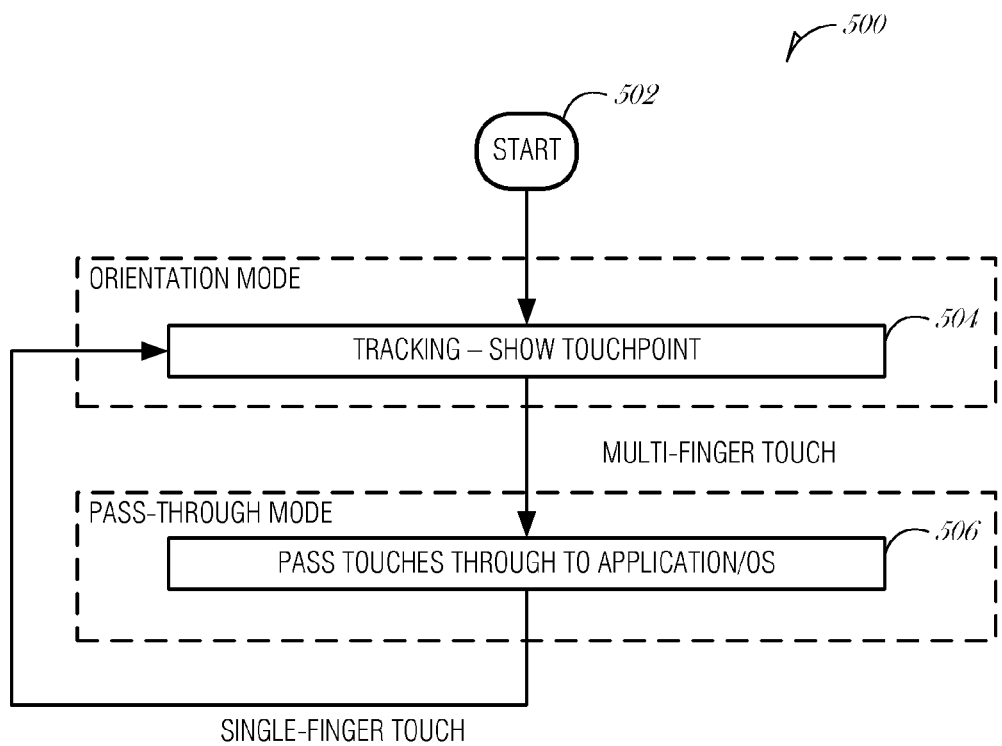
FIG. 5 is a flowchart illustrating a control flow to change operating modes of a presentation device, according to an embodiment.
FIG. 6 is a flowchart illustrating a method for remote multi-touch control, according to an embodiment.

FIG. 5 is a flowchart illustrating a control flow 500 to change operating modes of a presentation device 202, according to an embodiment. The control flow 500 begins at 502, where after a user initiates the remote device 204 or the presentation device 202 (e.g., turns it on or wakes from sleep), the presentation device 202 is placed into orientation mode. Thus, the presentation device 202 defaults to orientation mode and displays touchpoint indications (block 504) to the user. When the user uses a single-finger touch or gesture on the remote device 204, the touchpoint indication is displayed/tracked on the presentation device 202. When the user uses a multi-finger touch or gesture on the remote device 204, the control flow 500 transitions to the pass-through mode and touch input is passed through to the application or operating system of the presentation device 202 (block 506). Single-finger touch or gesture may cause the presentation device 202 to re-enter the orientation mode.

The user may be required to use a certain gesture to re-enter orientation mode or tap-and-hold a single-finger touch for a period of time. These types of mechanisms allow the user to use a single-finger touch input on the pass-through mode.

FIG. 6 is a flowchart illustrating a method 600 method for remote multi-touch control, according to an embodiment. At 602, an orientation mode for a user interface displayed by the presentation device is entered at a presentation device. The orientation mode may be configured to allow a user of the presentation device to orient an input point on the user interface with a remote device. In an embodiment, entering the orientation mode comprises receiving an indication that the user is contacting a plurality of touch points at the remote device. In an embodiment, the orientation mode is a default mode for the presentation device with respect to the remote device. In an embodiment, entering the orientation mode comprises receiving an indication that a gesture was performed at the remote device.

At 604, an input from the user to trigger the presentation device to transition from the orientation mode to a pass-through mode is received, the pass-through mode configured to allow the user to control an application at the presentation device using a touch point on the remote device.

In an embodiment, when in orientation mode, the method 600 comprises presenting a visual indication in the user interface corresponding to the touch point on the remote device. In an embodiment, presenting the visual indication comprises presenting a circle representing a location in the user interface corresponding with the touch point on the remote device. In an embodiment, when in orientation mode, the method 600 comprises presenting a contextual menu on the presentation device.

In an embodiment, receiving the input from the user to trigger the presentation device to transition from the orientation mode to the pass-through mode comprises receiving a voice command to transition modes. In an embodiment, receiving the input from the user to trigger the presentation device to transition from the orientation mode to the pass-through mode comprises receiving a message from a peripheral device, separate from the remote device, to transition modes. In a further embodiment, the peripheral device comprises a ring.

In an embodiment, receiving the input from the user to trigger the presentation device to transition from the orientation mode to the pass-through mode comprises receiving a signal from a control on the remote device to transition modes. In a further embodiment, the control comprises a hard button, a slider, or a soft button. A slider may be a physical slide mechanism on the frame or housing of the remote device 204. A soft button may be a software button or control displayed on the remote device 204.

In an embodiment, receiving the input from the user to trigger the presentation device to transition from the orientation mode to the pass-through mode comprises receiving an indication the user touched a particular finger to the remote device. In a further embodiment, the particular finger is mapped to a function in the user interface of the presentation device, and wherein after receiving the indication that the user touched the particular finger to the remote device, executing the function in the user interface.

In an embodiment, entering the pass-through mode comprises providing a signal to the remote device to provide haptic feedback to the user indicating the transition to the pass-through mode.

In an embodiment, entering the pass-through mode comprises providing a signal to the remote device to provide audio feedback to the user indicating the transition to the pass-through mode.

At 606, the pass-through mode is entered at the presentation device. In an embodiment, when in pass-through mode, the method comprises presenting a visual indication in the user interface corresponding to the touch point on the remote device. In a further embodiment, presenting the visual indication comprises presenting a circle representing a location in the user interface corresponding with the touch point on the remote device.

At 608, input from the user via the remote device is received. In an embodiment, receiving input from the user via the remote device comprises receiving one of a tap, a pattern of taps, a swipe, a squeeze, or a drag from the user.

At 610, input is passed through to the application at the presentation device.

In an embodiment, the method 600 comprises presenting a visual indication in the user interface corresponding to the touch point on the remote device and changing an attribute of the visual indication based on whether the presentation device is in the orientation mode or the pass-through mode. In a further embodiment, changing the attribute of the visual indication comprises changing the color of the visual indication. In another embodiment, changing the attribute of the visual indication comprises changing the shape of the visual indication.

In an embodiment, receiving input from the user via the remote device comprises receiving a gesture from the user, the gesture corresponding to an application or a function to be executed at the presentation device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
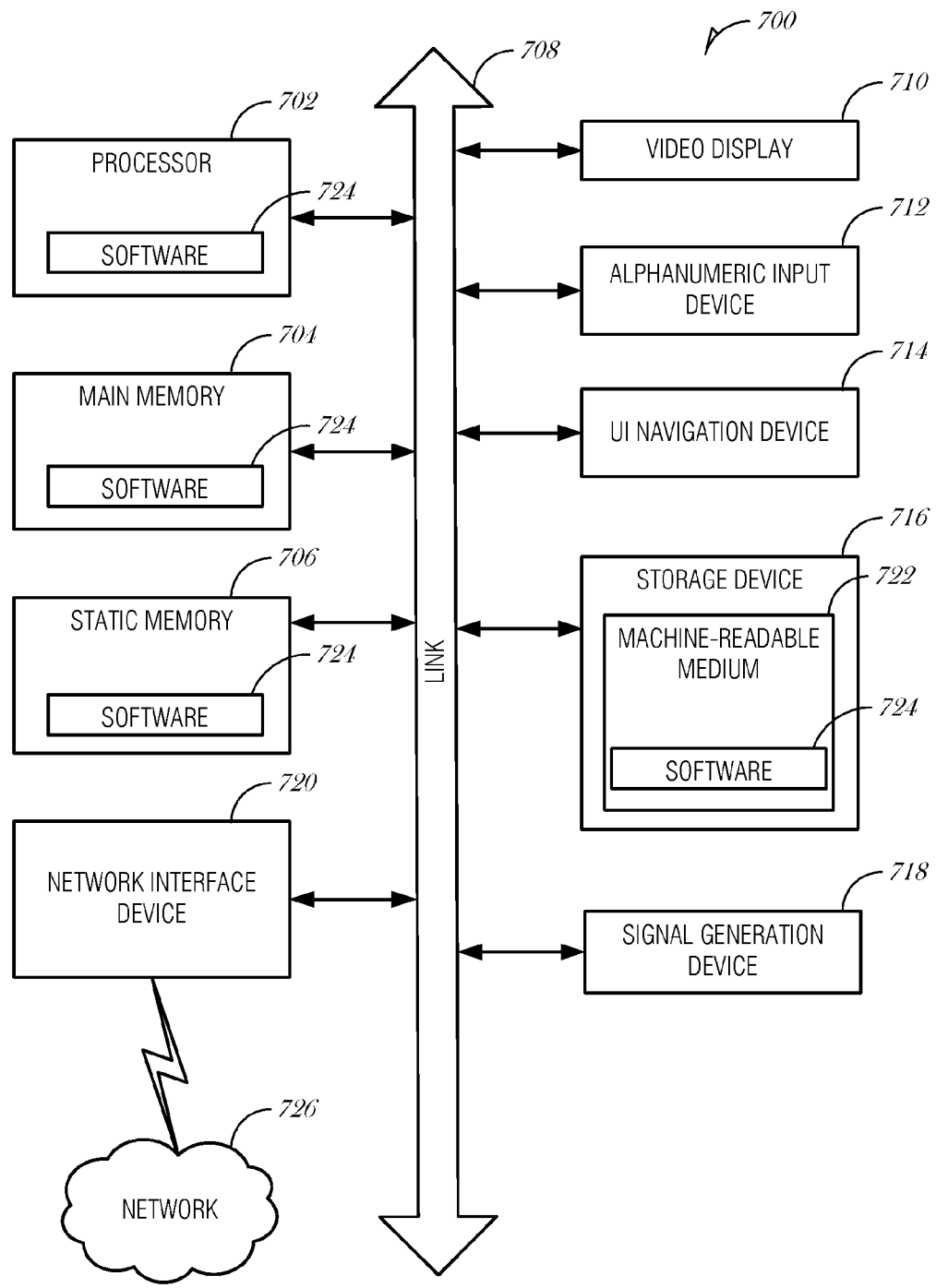
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) comprising a system to provide remote multi-touch control, comprising: a mode controller to enter an orientation mode for a user interface displayed by a presentation device, the orientation mode configured to allow a user of the presentation device to orient an input point on the user interface with a remote device; and an input/output module to receive an input from the user to trigger the presentation device to transition from the orientation mode to a pass-through mode, the pass-through mode configured to allow the user to control an application at the presentation device using a touch point on the remote device; wherein the mode controller is to enter the pass-through mode at the presentation device; wherein the input/output module is to receive input from the user via the remote device; and wherein the presentation device is to pass the input through to the application at the presentation device.

In Example 2, the subject matter of Example 1 may optionally include, wherein to enter the orientation mode, the mode controller is to receive an indication that the user is contacting a plurality of touch points at the remote device.

In Example 3, the subject matter of any one or more of Examples 1 to 2 may optionally include, wherein the orientation mode is a default mode for the presentation device with respect to the remote device.

In Example 4, the subject matter of any one or more of Examples 1 to 3 may optionally include, wherein to enter the orientation mode, the mode controller is to receive an indication that a gesture was performed at the remote device.

In Example 5, the subject matter of any one or more of Examples 1 to 4 may optionally include, wherein when in orientation mode, the presentation device is to present a visual indication in the user interface corresponding to the touch point on the remote device.

In Example 6, the subject matter of any one or more of Examples 1 to 5 may optionally include, wherein to present the visual indication, the presentation device is to present a circle representing a location in the user interface corresponding with the touch point on the remote device.

In Example 7, the subject matter of any one or more of Examples 1 to 6 may optionally include, wherein when in orientation mode, the presentation device is to present a contextual menu on the presentation device.

In Example 8, the subject matter of any one or more of Examples 1 to 7 may optionally include, wherein when in pass-through mode, the presentation device is to present a visual indication in the user interface corresponding to the touch point on the remote device.

In Example 9, the subject matter of any one or more of Examples 1 to 8 may optionally include, wherein to present the visual indication, the presentation device is to present a circle representing a location in the user interface corresponding with the touch point on the remote device.

In Example 10, the subject matter of any one or more of Examples 1 to 9 may optionally include, wherein the presentation device is to: present a visual indication in the user interface corresponding to the touch point on the remote device; and change an attribute of the visual indication based on whether the presentation device is in the orientation mode or the pass-through mode.

In Example 11, the subject matter of any one or more of Examples 1 to 10 may optionally include, wherein to change the attribute of the visual indication, the presentation device is to change the color of the visual indication.

In Example 12, the subject matter of any one or more of Examples 1 to 11 may optionally include, wherein to change the attribute of the visual indication, the presentation device is to change the shape of the visual indication.

In Example 13, the subject matter of any one or more of Examples 1 to 12 may optionally include, wherein to receive the input from the user to trigger the presentation device to transition from the orientation mode to the pass-through mode, the input/output module is to receive a voice command to transition modes.

In Example 14, the subject matter of any one or more of Examples 1 to 13 may optionally include, wherein to receive the input from the user to trigger the presentation device to transition from the orientation mode to the pass-through mode, the input/output module is to receive a message from a peripheral device, separate from the remote device, to transition modes.

In Example 15, the subject matter of any one or more of Examples 1 to 14 may optionally include, wherein the peripheral device comprises a ring.

In Example 16, the subject matter of any one or more of Examples 1 to 15 may optionally include, wherein to receive the input from the user to trigger the presentation device to transition from the orientation mode to the pass-through mode, the input/output module is to receive a signal from a control on the remote device to transition modes.

In Example 17, the subject matter of any one or more of Examples 1 to 16 may optionally include, wherein the control comprises a hard button, a slider, or a soft button.

In Example 18, the subject matter of any one or more of Examples 1 to 17 may optionally include, wherein to receive the input from the user to trigger the presentation device to transition from the orientation mode to the pass-through mode, the input/output module is to receive an indication the user touched a particular finger to the remote device.

In Example 19, the subject matter of any one or more of Examples 1 to 18 may optionally include, wherein the particular finger is mapped to a function in the user interface of the presentation device, and wherein after receiving the indication that the user touched the particular finger to the remote device, the presentation device is to execute the function in the user interface.

In Example 20, the subject matter of any one or more of Examples 1 to 19 may optionally include, wherein to enter the pass-through mode, the input/output module is to provide a signal to the remote device to provide haptic feedback to the user indicating the transition to the pass-through mode.

In Example 21, the subject matter of any one or more of Examples 1 to 20 may optionally include, wherein to enter the pass-through mode, the input/output module is to provide a signal to the remote device to provide audio feedback to the user indicating the transition to the pass-through mode.

In Example 22, the subject matter of any one or more of Examples 1 to 21 may optionally include, wherein to receive input from the user via the remote device, the input/output module is to receive one of a tap, a pattern of taps, a swipe, a squeeze, or a drag from the user.

In Example 23, the subject matter of any one or more of Examples 1 to 22 may optionally include, wherein to receive input from the user via the remote device, the input/output module is to receive a gesture from the user, the gesture corresponding to an application or a function to be executed at the presentation device.

Example 24 includes subject matter for remote multi-touch control (such as a method, means for performing acts, machine readable medium including instructions that when performed by a machine cause the machine to performs acts, or an apparatus configured to perform) comprising: entering, at a presentation device, an orientation mode for a user interface displayed by the presentation device, the orientation mode configured to allow a user of the presentation device to orient an input point on the user interface with a remote device; receiving an input from the user to trigger the presentation device to transition from the orientation mode to a pass-through mode, the pass-through mode configured to allow the user to control an application at the presentation device using a touch point on the remote device; entering, at the presentation device, the pass-through mode; receiving input from the user via the remote device; and passing the input through to the application at the presentation device.

In Example 25, the subject matter of Example 24 may optionally include, wherein entering the orientation mode comprises receiving an indication that the user is contacting a plurality of touch points at the remote device.

In Example 26, the subject matter of any one or more of Examples 24 to 25 may optionally include, wherein the orientation mode is a default mode for the presentation device with respect to the remote device.

In Example 27, the subject matter of any one or more of Examples 24 to 26 may optionally include, wherein entering the orientation mode comprises receiving an indication that a gesture was performed at the remote device.

In Example 28, the subject matter of any one or more of Examples 24 to 27 may optionally include, wherein when in orientation mode, the method comprises presenting a visual indication in the user interface corresponding to the touch point on the remote device.

In Example 29, the subject matter of any one or more of Examples 24 to 28 may optionally include, wherein presenting the visual indication comprises presenting a circle representing a location in the user interface corresponding with the touch point on the remote device.

In Example 30, the subject matter of any one or more of Examples 24 to 29 may optionally include, wherein when in orientation mode, the method comprises presenting a contextual menu on the presentation device.

In Example 31, the subject matter of any one or more of Examples 24 to 30 may optionally include, wherein when in pass-through mode, the method comprises presenting a visual indication in the user interface corresponding to the touch point on the remote device.

In Example 32, the subject matter of any one or more of Examples 24 to 31 may optionally include, wherein presenting the visual indication comprises presenting a circle representing a location in the user interface corresponding with the touch point on the remote device.

In Example 33, the subject matter of any one or more of Examples 24 to 32 may optionally include, presenting a visual indication in the user interface corresponding to the touch point on the remote device; and changing an attribute of the visual indication based on whether the presentation device is in the orientation mode or the pass-through mode.

In Example 34, the subject matter of any one or more of Examples 24 to 33 may optionally include, wherein changing the attribute of the visual indication comprises changing the color of the visual indication.

In Example 35, the subject matter of any one or more of Examples 24 to 34 may optionally include, wherein changing the attribute of the visual indication comprises changing the shape of the visual indication.

In Example 36, the subject matter of any one or more of Examples 24 to 35 may optionally include, wherein receiving the input from the user to trigger the presentation device to transition from the orientation mode to the pass-through mode comprises receiving a voice command to transition modes.

In Example 37, the subject matter of any one or more of Examples 24 to 36 may optionally include, wherein receiving the input from the user to trigger the presentation device to transition from the orientation mode to the pass-through mode comprises receiving a message from a peripheral device, separate from the remote device, to transition modes.

In Example 38, the subject matter of any one or more of Examples 24 to 37 may optionally include, wherein the peripheral device comprises a ring.

In Example 39, the subject matter of any one or more of Examples 24 to 38 may optionally include, wherein receiving the input from the user to trigger the presentation device to transition from the orientation mode to the pass-through mode comprises receiving a signal from a control on the remote device to transition modes.

In Example 40, the subject matter of any one or more of Examples 24 to 39 may optionally include, wherein the control comprises a hard button, a slider, or a soft button.

In Example 41, the subject matter of any one or more of Examples 24 to 40 may optionally include, wherein receiving the input from the user to trigger the presentation device to transition from the orientation mode to the pass-through mode comprises receiving an indication the user touched a particular finger to the remote device.

In Example 42, the subject matter of any one or more of Examples 24 to 41 may optionally include, wherein the particular finger is mapped to a function in the user interface of the presentation device, and wherein after receiving the indication that the user touched the particular finger to the remote device, executing the function in the user interface.

In Example 43, the subject matter of any one or more of Examples 24 to 42 may optionally include, wherein entering the pass-through mode comprises providing a signal to the remote device to provide haptic feedback to the user indicating the transition to the pass-through mode.

In Example 44, the subject matter of any one or more of Examples 24 to 43 may optionally include, wherein entering the pass-through mode comprises providing a signal to the remote device to provide audio feedback to the user indicating the transition to the pass-through mode.

In Example 45, the subject matter of any one or more of Examples 24 to 44 may optionally include, wherein receiving input from the user via the remote device comprises receiving one of a tap, a pattern of taps, a swipe, a squeeze, or a drag from the user.

In Example 46, the subject matter of any one or more of Examples 24 to 45 may optionally include, wherein receiving input from the user via the remote device comprises receiving a gesture from the user, the gesture corresponding to an application or a function to be executed at the presentation device.

Example 47 includes a machine-readable medium including instructions for remote multi-touch control, which when executed by a machine, cause the machine to perform any one of the Examples 1-46.

Example 48 includes an apparatus to provide multi-stage touch input for remote multi-touch control, the apparatus comprising means for performing any one of the Examples 1-46.

Example 49 includes an apparatus to provide multi-stage touch input for remote multi-touch control, the apparatus comprising: means for entering, at a presentation device, an orientation mode for a user interface displayed by the presentation device, the orientation mode configured to allow a user of the presentation device to orient an input point on the user interface with a remote device; means for receiving an input from the user to trigger the presentation device to transition from the orientation mode to a pass-through mode, the pass-through mode configured to allow the user to control an application at the presentation device using a touch point on the remote device; means for entering, at the presentation device, the pass-through mode; means for receiving input from the user via the remote device; and means for passing the input through to the application at the presentation device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for remote multi-touch control, which when executed by a machine, cause the machine to:
    enter, at a presentation device, an orientation mode for a user interface displayed by the presentation device, the orientation mode configured to allow a user of the presentation device to orient an input point on the user interface with a remote device;
    receive an input from the user to trigger the presentation device to transition from the orientation mode to a pass-through mode, the input comprising a message from a peripheral device that is separate from the remote device and operated by the user, the pass-through mode configured to allow the user to control an application at the presentation device using a touch point on the remote device;
    enter, at the presentation device, the pass-through mode;
    receive input from the user via the remote device; and
    pass the input through to the application at the presentation device.

2. The non-transitory machine-readable medium of claim 1, wherein the instructions to enter the orientation mode comprise instructions to receive an indication that the user is contacting a plurality of touch points at the remote device.

3. The non-transitory machine-readable medium of claim 1, wherein when in orientation mode, the machine-readable medium comprises instructions to present a visual indication in the user interface corresponding to the touch point on the remote device.

4. The non-transitory machine-readable medium of claim 3, wherein the instructions to present the visual indication comprise instructions to present a circle representing a location in the user interface corresponding with the touch point on the remote device.

5. The non-transitory machine-readable medium of claim 1, wherein when in orientation mode, the machine-readable medium comprises instructions to present a contextual menu on the presentation device.

6. The non-transitory machine-readable medium of claim 1, wherein when in pass-through mode, the machine-readable medium comprises instructions to present a visual indication in the user interface corresponding to the touch point on the remote device.

7. The non-transitory machine-readable medium of claim 6 wherein the instructions to present the visual indication comprise instructions to present a circle representing a location in the user interface corresponding with the touch point on the remote device.

8. The non-transitory machine-readable medium of claim 1, comprising instructions to:
    present a visual indication in the user interface corresponding to the touch point on the remote device; and
    change an attribute of the visual indication based on whether the presentation device is in the orientation mode or the pass-through mode.

9. The non-transitory machine-readable medium of claim 8, wherein the instructions to change the attribute of the visual indication comprise instructions to change the color of the visual indication.

10. The non-transitory machine-readable medium of claim 1, wherein the instructions to receive the input from the user to trigger the presentation device to transition from the orientation mode to the pass-through mode comprise instructions to receive a voice command to transition modes.

11. The non-transitory machine-readable medium of claim 1, wherein the instructions to receive the input from the user to trigger the presentation device to transition from the orientation mode to the pass-through mode comprise instructions to receive a signal from a control on the remote device to transition modes.

12. The non-transitory machine-readable medium of claim 1, wherein the instructions to receive the input from the user to trigger the presentation device to transition from the orientation mode to the pass-through mode comprise instructions to receive an indication the user touched a particular finger to the remote device.

13. The non-transitory machine-readable medium of claim 1, wherein the instructions to enter the pass-through mode comprise instructions to provide a signal to the remote device to provide haptic feedback to the user indicating the transition to the pass-through mode.

14. The non-transitory machine-readable medium of claim 1, wherein the instructions to enter the pass-through mode comprise instructions to provide a signal to the remote device to provide audio feedback to the user indicating the transition to the pass-through mode.

15. The non-transitory machine-readable medium of claim 1, wherein the instructions to receive input from the user via the remote device comprise instructions to receive a gesture from the user, the gesture corresponding to an application or a function to be executed at the presentation device.

16. A system to provide remote multi-touch control, the system comprising:
- a mode controller implemented at least in part in hardware, to enter an orientation mode for a user interface displayed by a presentation device, the orientation mode configured to allow a user of the presentation device to orient an input point on the user interface with a remote device; and
- an input/output module implemented at least in part in hardware, to receive an input from the user to trigger the presentation device to transition from the orientation mode to a pass-through mode, the input comprising a message from a peripheral device that is separate from the remote device and operated by the user, the pass-through mode configured to allow the user to control an application at the presentation device using a touch point on the remote device;
- wherein the mode controller is to enter the pass-through mode at the presentation device;
- wherein the input/output module is to receive input from the user via the remote device; and
- wherein the presentation device is to pass the input through to the application at the presentation device.

17. The system of claim 16, wherein to receive the input from the user to trigger the presentation device to transition from the orientation mode to the pass-through mode, the input/output module is to receive a message from a peripheral device, separate from the remote device, to transition modes.

18. A method for remote multi-touch control, the method comprising:
- entering, at a presentation device, an orientation mode for a user interface displayed by the presentation device, the orientation mode configured to allow a user of the presentation device to orient an input point on the user interface with a remote device;
- receiving an input from the user to trigger the presentation device to transition from the orientation mode to a pass-through mode, the input comprising a message from a peripheral device that is separate from the remote device and operated by the user, the pass-through mode configured to allow the user to control an application at the presentation device using a touch point on the remote device;
- entering, at the presentation device, the pass-through mode;
- receiving input from the user via the remote device; and
- passing the input through to the application at the presentation device.

19. The method of claim 18, comprising:
- presenting visual indication in the user interface corresponding to the touch point on the remote device; and
- changing an attribute of the visual indication based the presentation device is in the orientation mode or the pass-through mode.

20. The non-transitory machine-readable medium of claim 1, wherein the peripheral device is a ring.

UNITED STATES PATENT AND TRADEMARK OFFICE
CERTIFICATE OF CORRECTION

PATENT NO. : 9,880,697 B2  
APPLICATION NO. : 14/368517  
DATED : January 30, 2018  
INVENTOR(S) : Anderson et al.

Page 1 of 1

It is certified that error appears in the above-identified patent and that said Letters Patent is hereby corrected as shown below:

In the Claims

In Column 20, Line 25, in Claim 19, after "presenting", insert --a--

In Column 20, Line 27, in Claim 19, after "based", insert --on whether--

Signed and Sealed this  
Second Day of July, 2019

Andrei Iancu  
*Director of the United States Patent and Trademark Office*